United States Patent [19]
Kelly et al.

[11] Patent Number: 5,183,204
[45] Date of Patent: Feb. 2, 1993

[54] MIMETIC THERMOSTAT

[76] Inventors: Wayne T. Kelly, 1516 E. Main St., Unit 7, Meriden, Conn. 06450; Steven L. Levy, Main St., Woodbury, Conn. 06798

[21] Appl. No.: 848,315

[22] Filed: Mar. 9, 1992

[51] Int. Cl.⁵ .............................................. G01K 1/00
[52] U.S. Cl. .................................... 236/94; 165/11.1; D10/51; 116/216
[58] Field of Search ................. 236/94, 1 B; 165/11.1; 62/125, 126, 127; D10/50, 51; 116/216, 220, 221, 223, 224, 225, 293, 289, 307

[56] References Cited

U.S. PATENT DOCUMENTS

| | | | |
|---|---|---|---|
| D. 179,069 | 10/1956 | Dreyfuss | D52/7 |
| D. 204,622 | 5/1966 | Bieger | D52/7 |
| 3,596,380 | 8/1971 | Williams | 35/77 |
| 3,999,158 | 12/1976 | Rae | D10/50 X |
| 4,231,512 | 11/1980 | Johnson | D10/50 X |
| 4,582,251 | 4/1986 | Odom, Jr. et al. | 236/94 |
| 4,970,870 | 11/1990 | Midlang et al. | 236/94 X |

Primary Examiner—Harry B. Tanner
Attorney, Agent, or Firm—CTC & Associates

[57] ABSTRACT

Imitation thermostat which in its most elaborate form includes a thermostat face with temperature indication and setting indicator, a following device to have the temperature indicator gradually respond to a change in setting but not electrical or mechanical means to interconnect to a heating/cooling system.

5 Claims, 5 Drawing Sheets

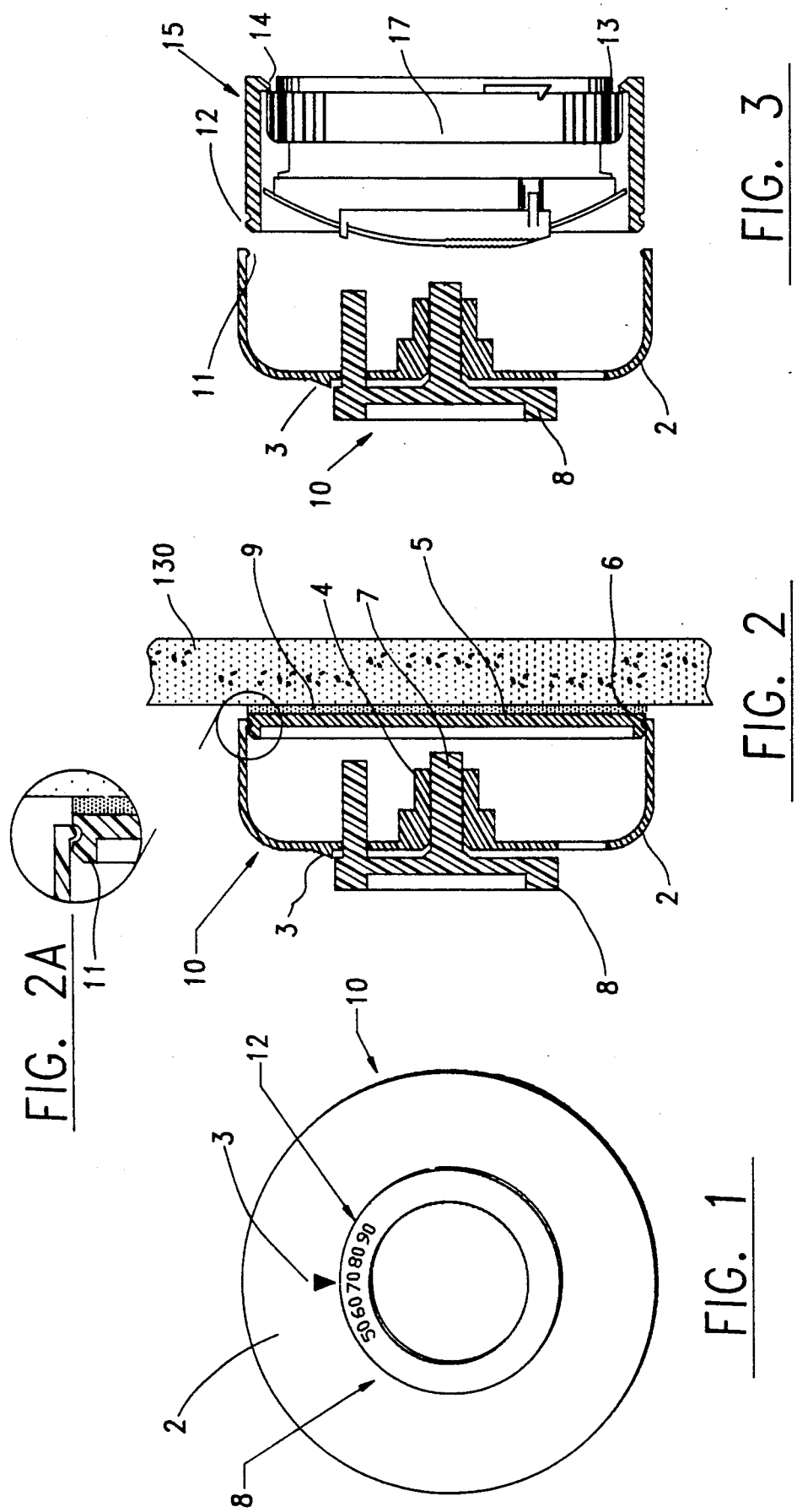

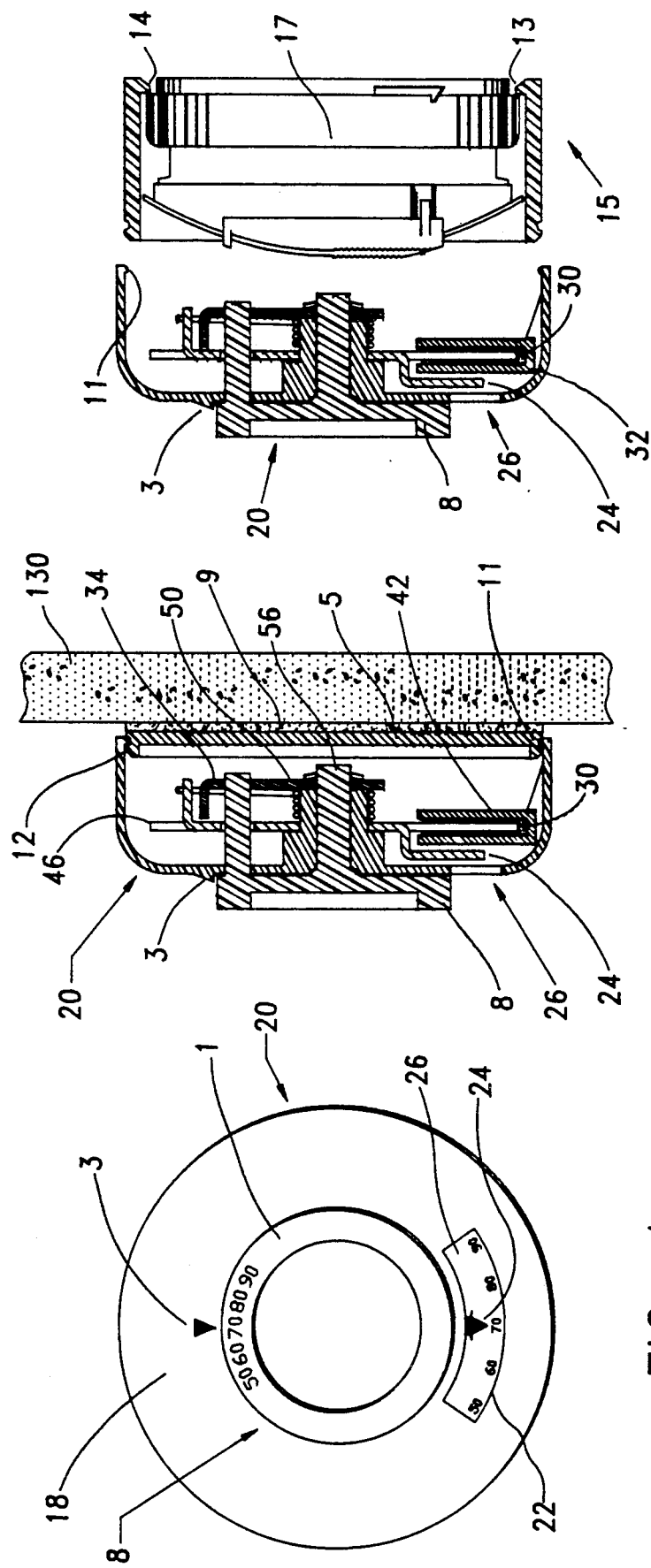

MIMETIC THERMOSTAT

BACKGROUND OF THE INVENTION

The perceived requirement for individual human comfort often causes the downfall of the most elaborate indoor climatic control systems in commercial buildings. It is common to have one person cold and another warm even in essentially climatically controlled heating/cooling systems. Therefore, one person turns up the thermostat followed by another person turning it down. This results in confusion in the computer control and energy inefficiency. Attempts have been made to thwart the juggling of thermostats, for example, placing a screened locked cage around thermostats or removing thermostat control indicators. These attempts have not been effective because of individuals ingenuity in overcoming these attempts, for example using a letter opener to pierce the screen and move the thermostat control to their desired comfort level. This problem extends from commercial buildings to the home where each resident invariably seeks to achieve their own comfort level. This, by raising and lowering thermostat settings to suit themselves without regard to the efficient use of energy.

OBJECT OF THE INVENTION

It is an important object of the invention to provide an mimetic thermostat which may be manipulated at will without affecting a building's heating/cooling system.

It is another important object of the invention to provide a placebo effect for individuals.

It is another important object of the invention to provide an illusion of control of the ambient temperature.

It is yet another important object of the invention to reduce energy consumption in building heating/cooling systems by reducing ambient temperature swings.

If is even yet another important object of the invention to reduce the maintenance requirements of building heating/cooling systems.

PRIOR ART

A preliminary search for patentability revealed the following prior art:

U.S. Pat. No. Des. 179,069 Dreyfus and U.S. Pat. No. Des. 183,164 appear to be designs for thermostats currently on the market.

U.S. Pat. No. Des. 204,622, Bieger appears to be a design for another thermostat currently on the market.

U.S. Pat. No. 3,596,380 is an educational toy which incorporates a number of concentrically disposed annular rings which reflects alignment and appearance of the toy.

U.S. Pat. No. 4,582,251 deals with a thermostat with raised indicia, enlarged numbers and positive click engagement means for use by sight handicapped people.

None of the art found reflects on the instant invention.

BRIEF DESCRIPTION OF THE INVENTION

In its simplest form the instant invention may be in the form of any one of the thermostats on the market including a cover or window through which to read existing temperature, a temperature setting indicator with no means to connect the same to heating/cooling systems and back plate which may have a pressure sensitive adhesive affixed thereon to adhere the imitation thermostat to a wall. When on the wall, individuals can juggle the setting at will without affecting actual heating/cooling system controls.

In another more elaborate form, the mimetic thermostat may contain a temperature reading indicator which follows the temperature setting of the thermostat in a delayed manner so that an individual may relate to the temperature reading indicator slowly responding to the temperature setting thus lulling the individual into a sense of control over the ambient temperature and a sense of comfort without affecting the actual temperature or the controls of the heating/cooling system. In this more elaborate form, mimetic thermostat may utilize a backplate with pressure sensitive backing to be directly mounted on a wall. Alternatively the mimetic thermostat may be mounted over an operational thermostat by use of an extension sleeve which has clips on the forward and rear edges to interlock with the operational thermostat's wall mounting and mimetic thermostat's housing. Such extension will have perforated walls to permit the unrestricted flow of air to the operational thermostat.

DESCRIPTION OF THE DRAWING

FIG. 1 is a front view of a simple round mimetic thermostat;

FIG. 2 is a section view of a simple mimetic thermostat and backplate;

FIG. 2A is an expanded section view of interlocking snap fitting;

FIG. 3 is a section view of a simple mimetic thermostat and extension sleeve;

FIG. 4 is a front view of the more elaborate round mimetic thermostat;

FIG. 5 is a section view of the more elaborate round mimetic thermostat;

FIG. 6 is a section view of the more elaborate round mimetic thermostat with an extension sleeve to cover an operational thermostat;

DETAILED DESCRIPTION OF THE INVENTION

Figure 8:
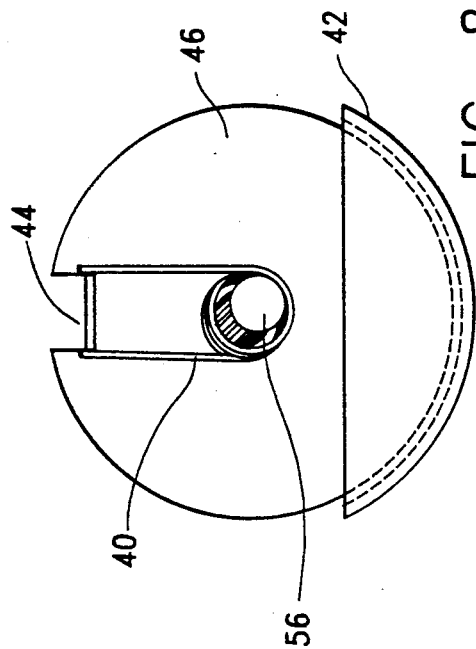
FIG. 8 is the mounted torsion spring.
Figure 10:
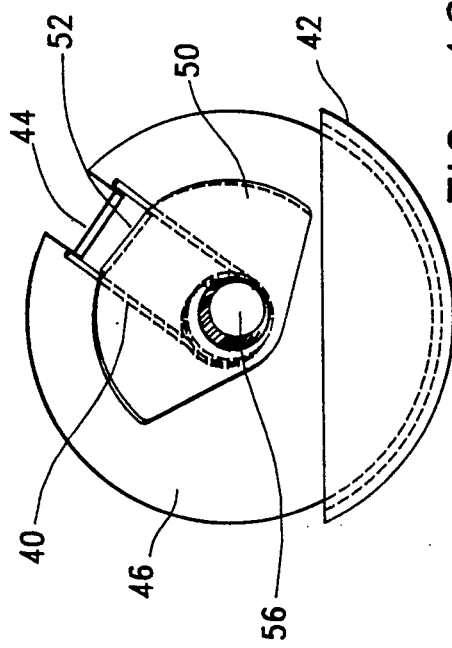
FIG. 10 is the mounted torsion spring after moving the temperature indicator.

FIG. 1 illustrates face of the invention in its simplest 10 form as a circular thermostat with a temperature setting knob 8 with temperature gradients 12 embossed or otherwise affixed thereon. Knob 8 FIG. 2 has a shaft 7 which rotatably fits into bushing 4 which is part of housing 2. Housing 2 has an indicator mark 3 embossed thereon so that as knob 8 is rotated thereunder the apparent desired temperature may be set. Backplate 5 is mounted on a wall 130 utilizing pressure sensitive adhesive 9. Housing 2 and backplate 5 are removably interlocked with snap fittings 11, shown in expanded view 2A and 6 which extend circumferentially around housing 2 and backplate 5.

An alternative method of mounting mimetic thermostat 10 is by use of extension sleeve 15 FIG. 3 which mounts over operational thermostat 17 and interlocks circumferentially with snap fittings 13 and 14. Mimetic thermostat 10 is mounted on sleeve extension 15 by interlocking snap fittings 11 and 12 which extend circumferentially around housing 2 and sleeve 15 respectively. Sleeve 15 should be perforated to permit air flow to the operational thermostat. In either mode an individual may rotate knob 8 under indicator mark 3 to an individual's desired temperature setting without affecting the operational heating/cooling system thermostat.

In another more elaborate interacting mechanical system, the mimetic thermostat temperature setting will gradually be followed by a temperature reading indicator. Therefore, when an individual rotates temperature setting knob 8 FIGS. 4, 5 and 6 to a desired temperature, temperature indicator 24 appearing in window 26 which has a temperature scale 22 affixed thereon will gradually move toward the desired temperature setting thus duplicating the action of an operational thermostat temperature reading indicator to respond to a new temperature setting. The response rate is readily controllable by a viscous fluid dampening system which in its stripped down version is shown in FIGS. 7, 8, 9 and 10.

Figure 7:
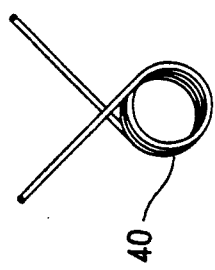
FIG. 7 is a torsion spring in relaxed form.
Figure 9:
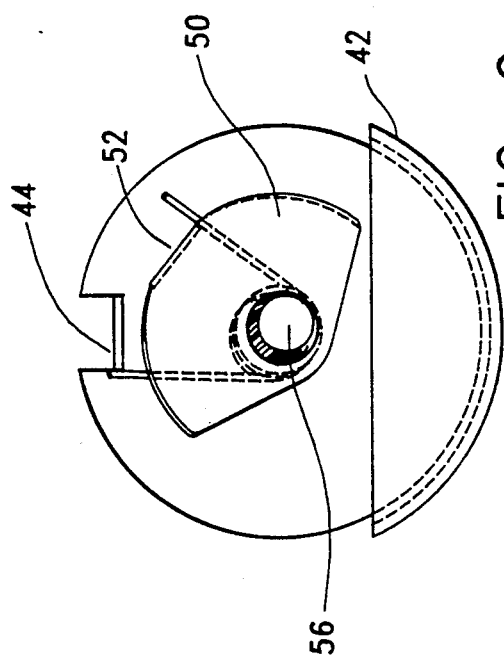
FIG. 9 is a mounted torsion spring that has been distorted by moving.

In the dampening system torsion spring 40 FIG. 7 is mounted on shaft 56 and on follower plate 46 so that the legs A & B are separated and positioned (left to right) by tab 44 on follower plate 46. Another contact with torsion spring 40 is made by actuator plate tab 52 located on actuator plate 50. Actuator plate 50 is connected to temperature setting knob 8 and follower plate 46 is connected to temperature reading indicator 24 FIG. 4. As the temperature setting (actuator plate) is rotated to increase the temperature (clockwise) activator plate 50 and tab 52 spreads torsion spring 40 putting tension on tab 44 leg A on follower plate 46 causing the follower plate to rotate to realign it and actuator plate 50. The rate of rotation of the follower plate is dampened by a viscus fluid 30 such as a non thixotropic silicone fluid located in holding trough 42 FIG. 5 and shown in phantom in FIGS. 8, 9 and 10 into which the follower plate extends. Torsion spring 40 torque may favorably operate in the range of 0.50–1.0 in. lbs. (35–70 gm/cm) but preferably 0.70–0.80 in. lbs. (49.2–56.3 gm/cm) to avoid stiction (irregular sticking) of the follower plate in the holding trough. Tolerances of holding trough 42 and follower plate and relationship to each other are important in determining the viscosity of the oil selected to dampen the movement of the follower plate in relationship to the movement of actuator plate. If the tolerances between the follower plate and inner walls of the trough are too large a very high viscosity oil, virtually a grease, is needed to achieve a dampening action. However, as most very high viscosity oils or greases tend to be thixotropic and therefore useless because of the non uniform dampening effect. In the instant invention the space between the follower plate and walls of the trough may be between 0.020 inch (0.051 cm) to 0.030 inch (0.0762 cm) and preferably 0.022 inch (0.056 cm) to 0.025 inch (0.064 cm); the follower plate should extend into or be immersed into the dampening fluid a minimum of 0.4 inch (1.02 cm) and maximum of 0.6 inch (1.52 cm) and preferably 0.5 inch (1.27 cm). In such dimensioned system a silicone fluid with a lineal viscosity of 62,000 centipoise will achieve the desired dampening rate of a 5° F. (2.78° C.) rise or fall in 5–10 minutes to duplicate the action of a temperature reading indicator on an operational thermostat.

As in the simple version FIGS. 1–3 the more elaborate circular mimetic thermostat may be directly fastened to a wall with backplate 5 and pressure sensitive backing 9. Alternately it may be placed over an operational thermostat by utilization of sleeve 15 which should be perforated and which is snapped in place over existing thermostat. Mimetic thermostat 20 is mounted onto sleeve 15 thus covering or hiding operational thermostat 17.

Figure 12:
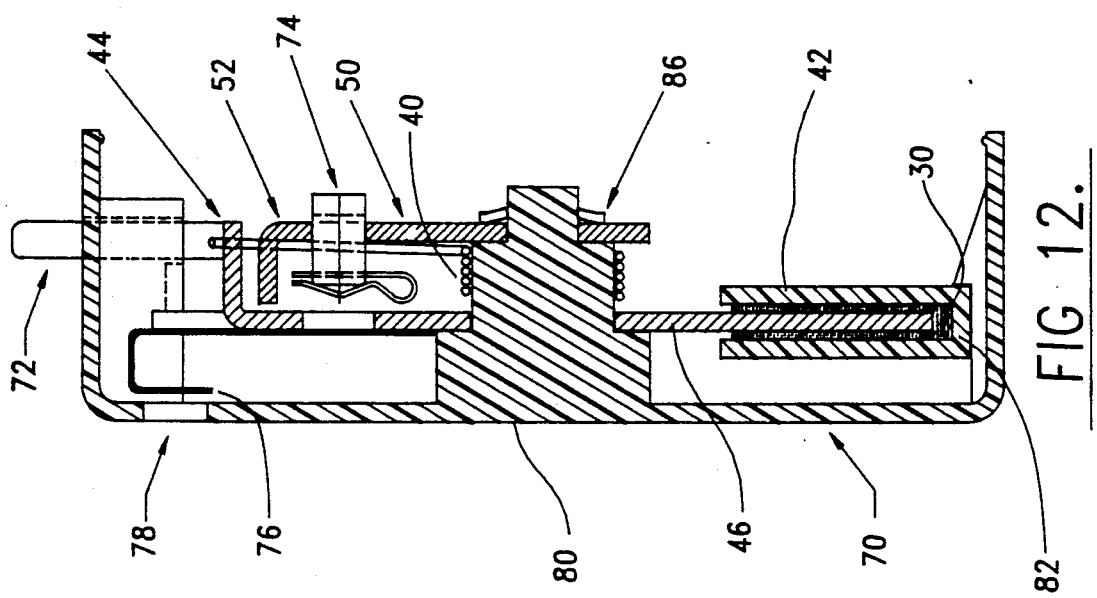
FIG. 12 is an expanded section of a more elaborate rectangular mimetic thermostat mechanism.
Figure 11:
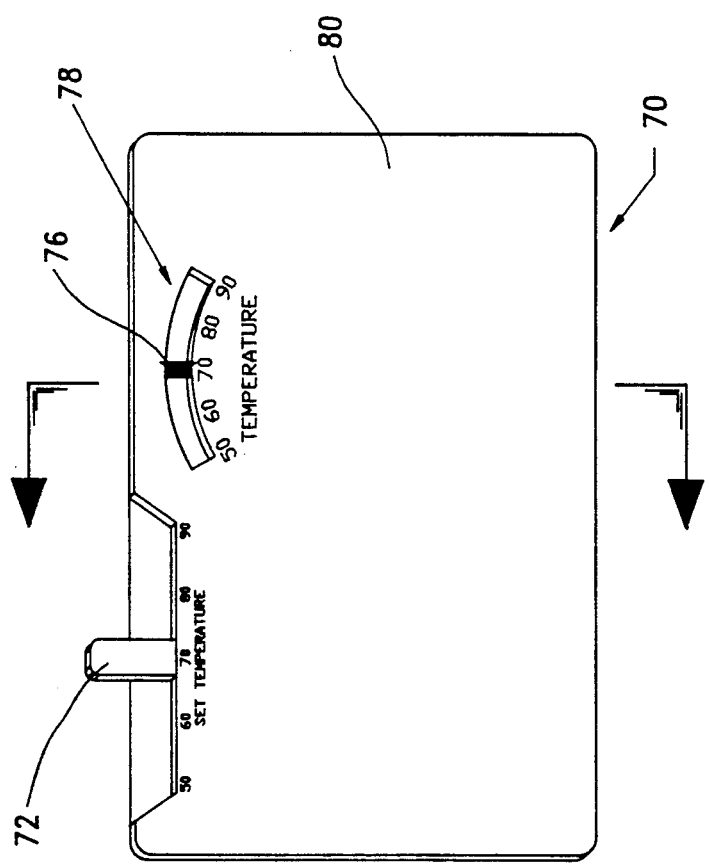
FIG. 11 is a front view of a more elaborate rectangular mimetic thermostat.
Figure 13:
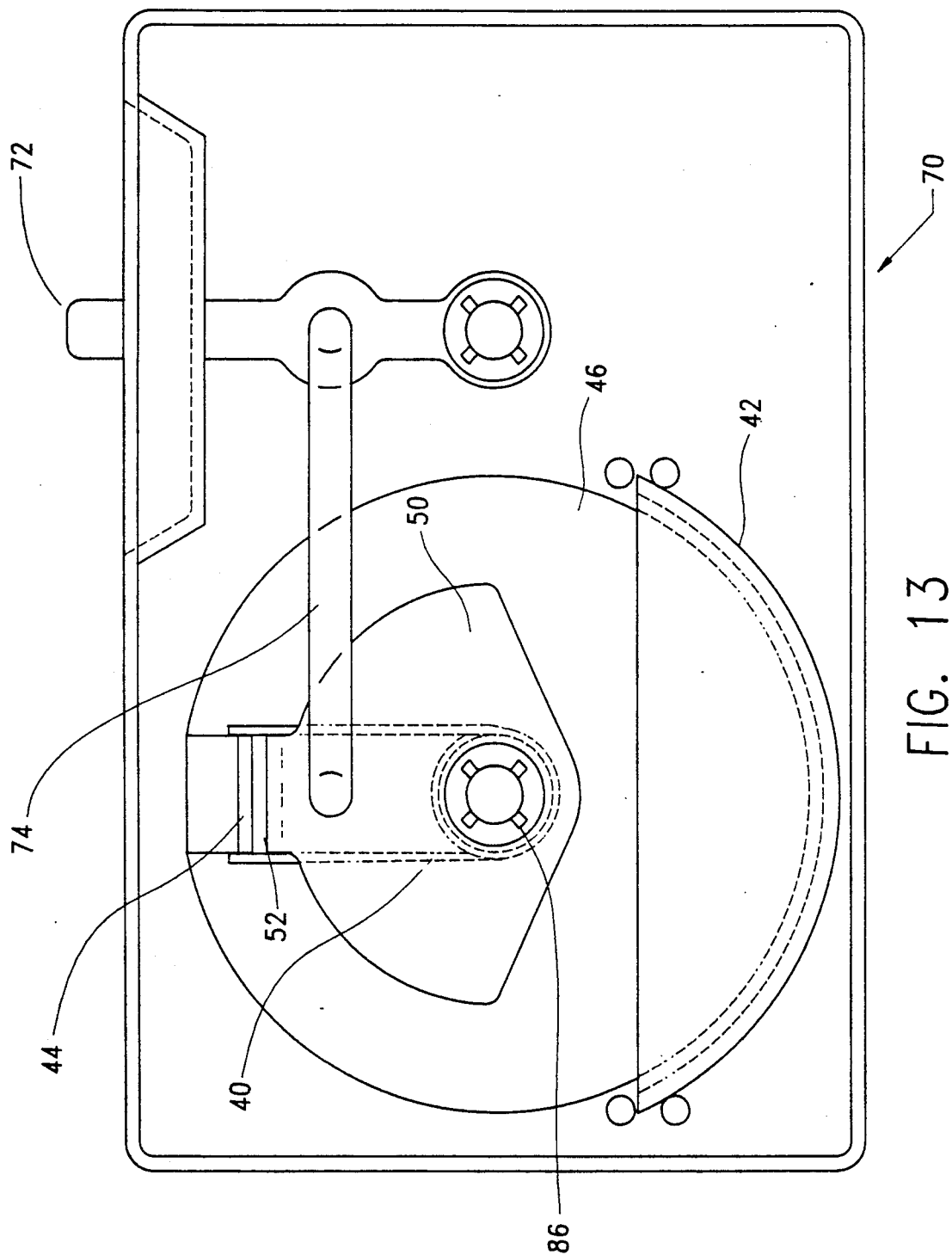
FIG. 13 is a back view of rectangular mimetic thermostat and linkage.

In the rectangular version of mimetic thermostat, FIGS. 11, 12 and 13, mimetic thermostat 70 operates by moving set temperature lever 72 to a desired temperature. Linkage 74 connects lever 72 to actuator plate 50 as shown in FIGS. 12 and 13. Activator plate movement causes torque spring 40 to move follower plate at a dampened rate to move temperature reading indicator toward the desired temperature set by lever 72. Temperature reading indicator 76 gradually moves and is viewed through temperature display window 78 to duplicate the desired temperature as set by lever 72. Rectangular mimetic thermostat 70 has housing 80 which covers the entire mechanism. As with round mimetic thermostat 20, rectangular version may be affixed to a wall by the use of a rectangular backplate (not shown) which has pressure sensitive adhesive affixed thereon or may be mounted over an existing rectangular thermostat by use of a perforated rectangular sleeve (not shown) onto which mimetic rectangular thermostat fits to hide the operational rectangular thermostat. In all cases the existing operating thermostats must have their respective temperature setting knobs or levers removed to prevent access to persons wishing to adjust temperature settings to their own desired needs.

The above descriptions of the instant invention are exemplary only and are not illustrative of the principals of this invention and are not to be interpreted to limit the scope of the invention.

What is claimed is:

1. A mimetic thermostat which is not interconnected to a building's heating/cooling system comprising a housing, temperature setting means and temperature reading means, two temperature gradients; the first of said two temperature gradients is made part of said temperature setting means, the second of said two temperature gradients is made part of a temperature reading indicator, a viscous fluid dampening means to dampen temperature reading indicator in response to movement of temperature setting means, and a wall mounting means collectively forming an interacting mechanical system acting to provide an illusion of actual vs. set temperature.

2. A mimetic thermostat of claim 1 which has a circular configuration wherein said temperature setting means is a knob which has a shaft said shaft rotatably mounted in a bushing which is part of a housing, said housing having the appearance of an operational thermostat.

3. A mimetic thermostat of claim 1 which has rectangular configuration wherein said temperature setting means is a lever which is interconnected to said viscous fluid dampening means to dampen the response of said temperature reading indicator to movement of said temperature setting lever.

4. A mimetic thermostat of claim 1 wherein said mimetic thermostat is mounted directly on a wall by an interconnecting backplate, said backplate having a pressure sensitive adhesive to adhere onto said wall, said mimetic thermostat interconnecting with said backplate.

5. A mimetic thermostat of claim 1 wherein said mimetic thermostat is mounted over an existing operational thermostat by use of an extension sleeve, said extension sleeve having a forward and rearward edge said rearward edge interconnecting with the wall mounting plate of said operational thermostat, said forward edge interlocking with said forward edge of said extension sleeve interlocking with said housing of said mimetic thermostat.

* * * * *